(12) United States Patent
Huntsberger et al.

(10) Patent No.: US 6,508,320 B2
(45) Date of Patent: Jan. 21, 2003

(54) CHILDREN'S RIDE-ON VEHICLE AND BUCKET ASSEMBLY

(75) Inventors: Kurt J. Huntsberger, Chaffee, NY (US); Daniel J. Damon, West Seneca, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/779,989

(22) Filed: Feb. 8, 2001

(65) Prior Publication Data

US 2002/0105182 A1 Aug. 8, 2002

(51) Int. Cl.$^7$ ............... B60K 1/00; B66F 9/00; A63H 17/12
(52) U.S. Cl. ............ 180/65.1; 414/685; 446/425
(58) Field of Search ............ 180/65.1; 446/425, 446/427, 426, 428; 414/685, 686, 694

(56) References Cited

U.S. PATENT DOCUMENTS

| | | | |
|---|---|---|---|
| 2,816,772 A | | 12/1957 | LaPointe |
| 2,822,641 A | | 2/1958 | Lamb |
| 2,985,983 A | | 5/1961 | Konstenius |
| 3,205,612 A | * | 9/1965 | Zbikowski .......... 446/425 |
| 3,462,874 A | | 8/1969 | Pauly et al. |
| 3,691,681 A | | 9/1972 | Gagnon |
| 3,874,111 A | | 4/1975 | Pauly et al. |
| 3,911,615 A | | 10/1975 | Alexander |
| 3,931,693 A | | 1/1976 | Alexander |
| 4,236,344 A | | 12/1980 | Kelly |
| 4,516,648 A | | 5/1985 | Berger et al. |
| 4,705,449 A | | 11/1987 | Christianson et al. |
| D314,389 S | | 2/1991 | Lynnes et al. |
| 5,009,566 A | * | 4/1991 | Asche .............. 414/722 |
| 5,169,278 A | * | 12/1992 | Hoechst et al. ....... 414/685 |
| 5,282,566 A | * | 2/1994 | Lammers et al. ..... 228/161 |
| 5,570,925 A | | 11/1996 | Cohen |
| 5,609,464 A | * | 3/1997 | Moffitt et al. ....... 414/685 |
| 5,611,657 A | * | 3/1997 | Peterson .......... 414/722 |
| 5,879,221 A | | 3/1999 | Barton et al. |
| 5,964,640 A | | 10/1999 | Barton et al. |
| D419,618 S | | 1/2000 | Park |
| 6,109,858 A | | 8/2000 | Deneve et al. |
| D431,575 S | | 10/2000 | Park |
| 6,171,050 B1 | * | 1/2001 | Johnson ............ 414/685 |
| 6,179,331 B1 | * | 1/2001 | Jone, Jr. et al. ....... 280/827 |
| 6,325,589 B1 | * | 12/2001 | Jang et al. .......... 414/686 |
| 6,345,676 B1 | * | 2/2002 | Huntsberger et al. ... 180/65.1 |

OTHER PUBLICATIONS

Caterpillar© Dump Truck Owner's Manual, Power Wheels by Fisher–Price, 1999.
Caterpillar© Front Loader Jr. Owner's Manual, Power Wheels by Fisher–Price, 1997.
Power Wheels 1994 Catalog, Intermediate Series, p. 14, Kransco Co.
Power Wheels 1994 Catalog, Big Jake™ Dump Truck, p. 15, Kransco Co.
Power Wheels 1987 Catalog, Caterpedal Construction Tractor, p. 19, Kransco Co.

* cited by examiner

Primary Examiner—Brian L. Johnson
Assistant Examiner—Jeffrey J. Restifo
(74) Attorney, Agent, or Firm—Kolisch Hartwell, P.C.

(57) ABSTRACT

A children's ride-on vehicle with a bucket assembly. The assembly includes a bucket configured to carry a predetermined load and at least one arm, which is selectively moveable between a plurality of positions. The assembly includes a handle adapted to move and selectively retain the arm into each of the positions. The handle is also adapted to breakaway from a set position when the predetermined load is exceeded. The bucket assembly may also include a pinch mechanism and a stopping assembly.

43 Claims, 6 Drawing Sheets

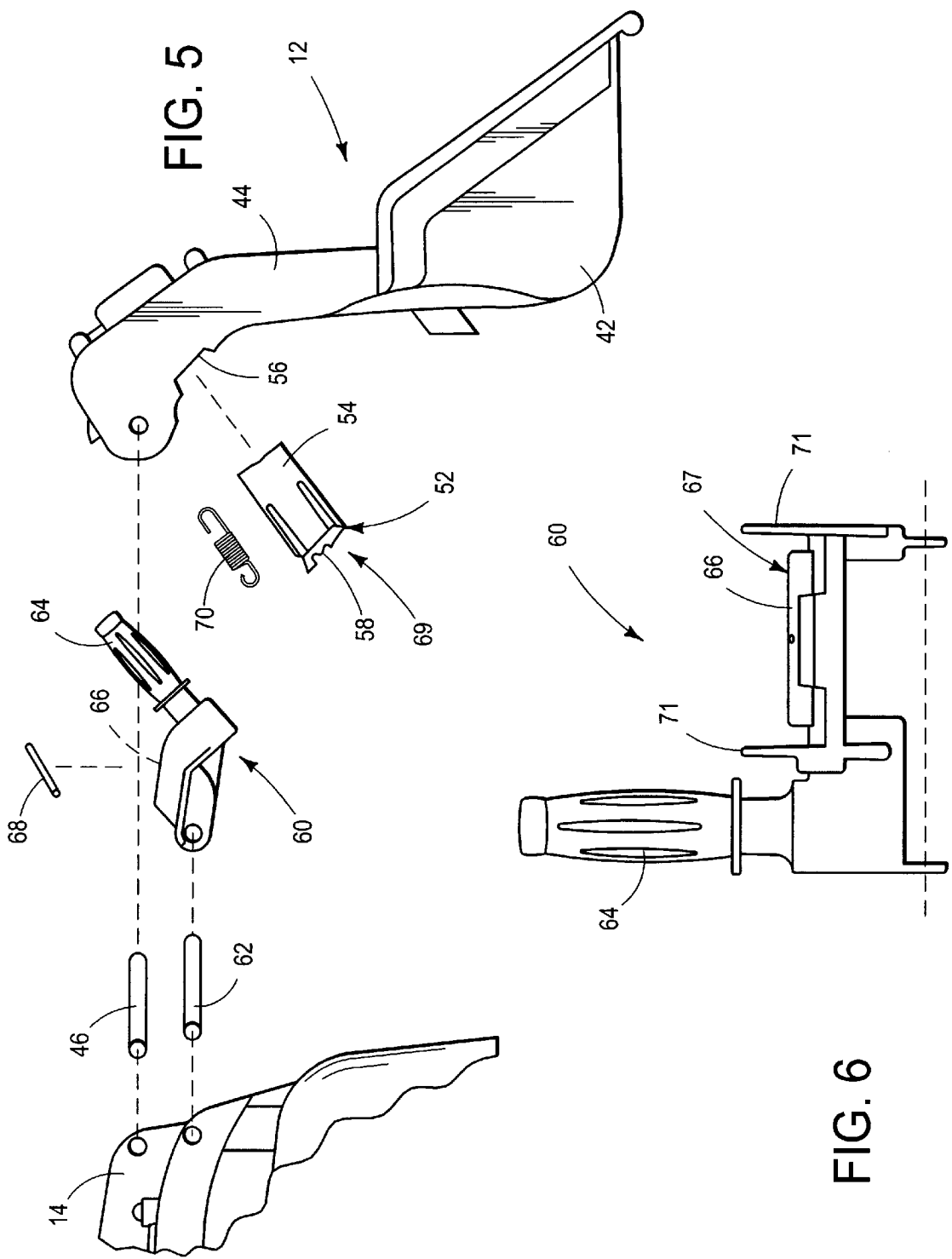

CHILDREN'S RIDE-ON VEHICLE AND BUCKET ASSEMBLY

FIELD OF THE INVENTION

The present invention is directed to children's ride-on vehicles, and more particularly, to a children's ride-on vehicle with a bucket assembly.

BACKGROUND

Battery-powered children's ride-on vehicles are popular toys for children. The vehicles may be modeled after real-life vehicles operated by adults. To enhance the appeal of the children's vehicle, many of the features available on the adult model are simulated on the children's vehicle in both appearance and operation. For example, movable buckets, trunks and hoods are all features that may be imitated on the children's vehicle and may look like the adult feature, and may also have matching functionality.

Examples of real life vehicles that have appeal to children are construction vehicles, such as loaders. Loaders typically have a large bucket or shovel attached to the vehicle that can be lowered for loading and raised to a variety of positions for transport and unloading. Such a functional loader or moveable shovel may be appealing to children. However, in adapting a children's vehicle to resemble a loader or to have a moveable shovel, additional safety features must be provided to make the vehicle suitable for use by young children.

SUMMARY OF THE INVENTION

The present invention provides a children's ride-on vehicle with a bucket assembly. The bucket assembly includes a bucket configured to carry a predetermined load and at least one arm, which is selectively moveable between a first lowered position and a plurality of raised positions. The bucket assembly includes a handle adapted to move and selectively retain the arm in each of the positions. The arm is also adapted to breakaway from a raised position when the predetermined load is exceeded. The bucket assembly may also include a pinch mechanism and a stopping assembly to prevent the bucket assembly from being forcibly moved beyond the standard positions.

BRIEF DESCRIPTION OF THE DRAWINGS

FIG. 5 is an exploded view of the components of the bucket assembly shown in FIG. 1, including a bucket handle assembly.

FIG. 6 is a rear elevation view of the bucket handle assembly as shown in FIG. 5.

DETAILED DESCRIPTION AND BEST MODE OF THE INVENTION

Figures 1, 2:
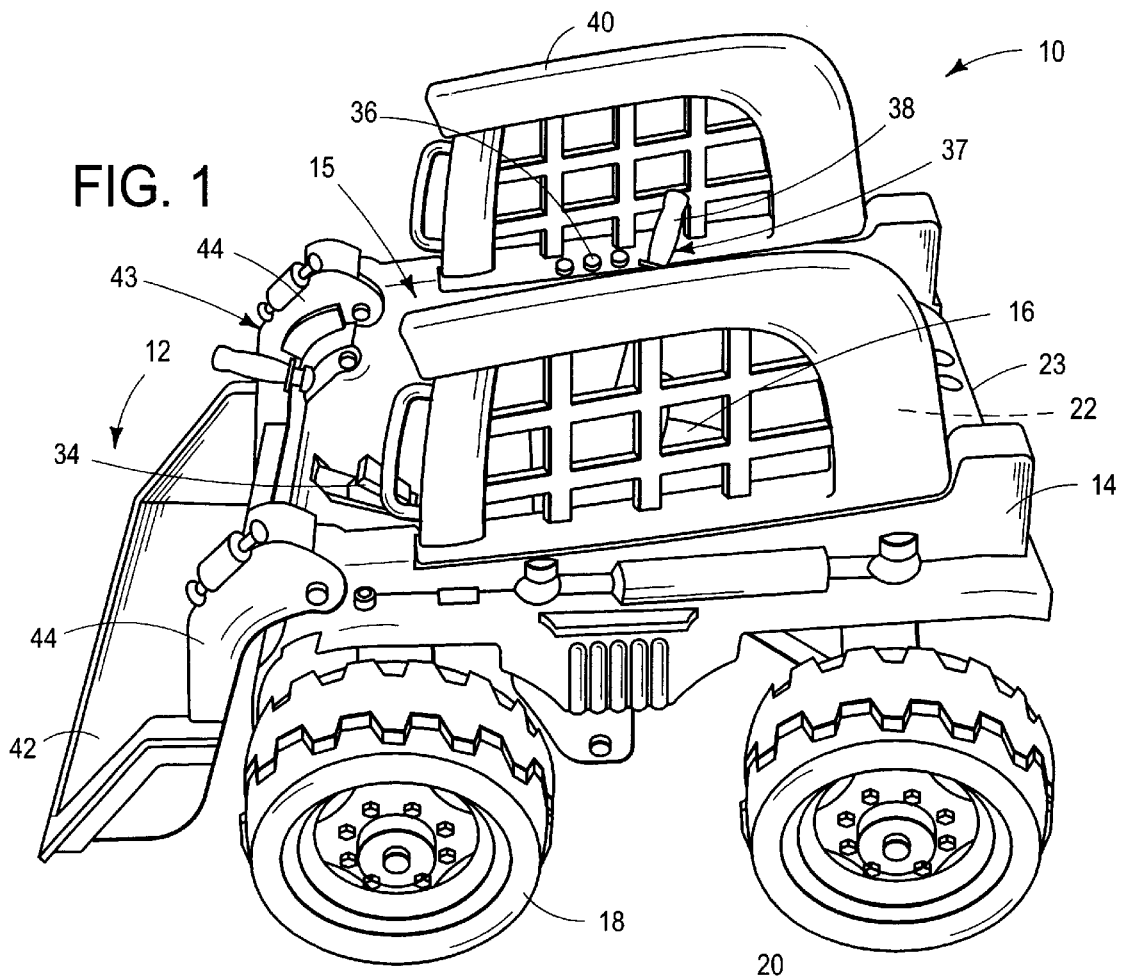
FIG. 1 is an isometric view of a children's ride-on vehicle having a bucket assembly in accordance with the present invention.
FIG. 2 is a schematic block diagram of a drive assembly of the ride-on vehicle of FIG. 1.

A children's ride-on vehicle constructed according to the present invention is indicated generally at 10 in FIG. 1. Ride-on vehicle 10 includes a bucket assembly 12. Bucket assembly 12 is adapted to be selectively adjusted to a plurality of positions. Moreover, bucket assembly 12 includes one or more safety features, such as a breakaway mechanism, a pinch relief mechanism and a stopping assembly, all of which are shown for purposes of illustration.

Children's ride-on vehicle 10 is a reduced scale or scaled-down version of a larger adult vehicle. Vehicle 10, as shown in the exemplary embodiments described below, resembles a full-size skid steer loader. However, it is within the scope of the invention that bucket assembly 12 may be configured for use on any type of children's ride-on vehicles or reduced-sized vehicles. For example, vehicle 10 may take any one of a variety of forms adapted to resemble a real-sized vehicle in a reduced scale, including, but not limited to, trucks, cars, farm vehicles, and construction vehicles. Moreover, vehicle 10 may be modeled after fantasy vehicles, which have no real-life counterpart.

Children's ride-on vehicle 10 includes a support frame or body 14. Body 14 includes a passenger region 15. Passenger region 15 of body 14 is adapted and sized to carry at least one child. To accommodate a child, body 14 typically includes at least one seat 16 sized to receive a child.

Body 14 is typically formed from molded plastic and may be a single integral unit or may include multiple parts. The multiple parts are typically secured together by screws, bolts, nuts, rivets, clips or other conventional fasteners. It should be understood that the body may be formed from any other suitable materials and such a construction is within the scope of the invention.

Figure 3:
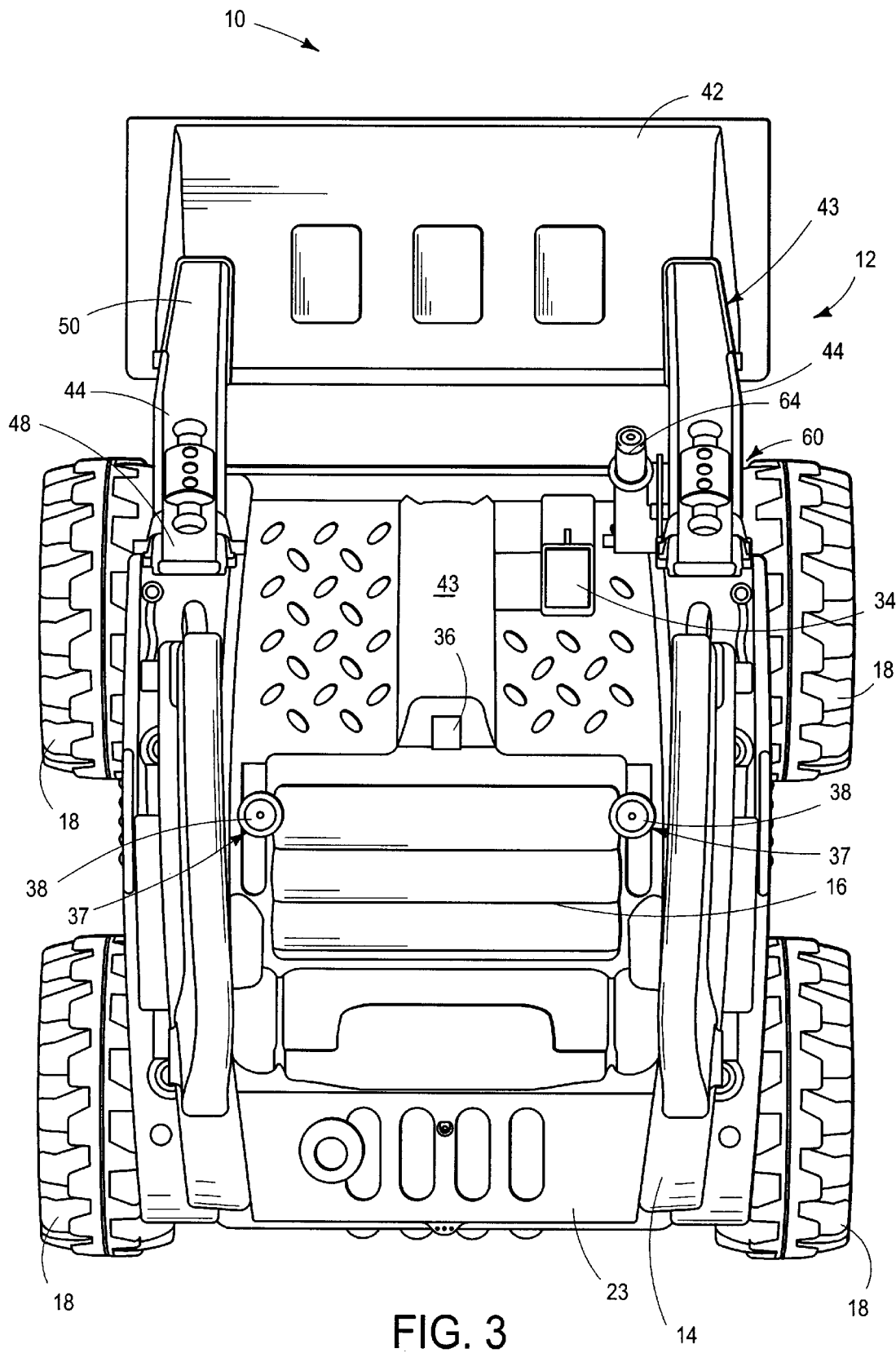
FIG. 3 is an overhead plan view of the ride-on vehicle of FIG. 1.

Vehicle 10 also includes a ground traveling structure that permits vehicle 10 to move across a surface. Examples of suitable ground traveling structures include wheels, treads, skis, skids or other similar type of mechanism. For example, as shown in FIGS. 1 and 3, the ground traveling structure includes a plurality of wheels, which are generally indicated at 18. Vehicle 10 in FIG. 3 includes four wheels, however, the number of wheels may vary. Vehicles with two or more wheels are within the scope of the invention, but children's vehicles will typically include at least three wheels to provide stability. Moreover, although the wheels are shown to be generally the same size, it should be understood that any combination of different sized wheels are within the scope of the invention.

Wheels 18 are rotatively coupled to body 14 of vehicle 10. The wheels or ground traveling structure are driven through drive assembly 20 as shown in FIG. 2. Any suitable mechanism known in the art may be used for drive assembly 20. For example, in the illustrated embodiments, vehicle 10 includes driven rear wheels. However, it will be appreciated that drive assembly 20 could be coupled to drive only one of the rear wheels, one of the front wheels, both front wheels, all four wheels, one front wheel and one rear wheel, or any combination thereof. In other words, vehicle 10 may be rear-wheel driven, front-wheel driven, diagonally driven or all-wheel driven. Drive assembly 20 may be coupled directly to the wheels or may be indirectly coupled to the wheels through gears, belts, wiring harnesses and other suitable linkages.

Drive assembly 20, as schematically illustrated in FIG. 2, includes battery assembly 22, motor assembly 24, motor output linkage mechanism 26, steering assembly 28 and at least one driven wheel 30. Battery assembly 22 includes at least one battery adapted to provide power to motor assembly 24. Alternatively, vehicle 10 may be configured to be powered by a child rider, for example, vehicle 10 may be pedal powered or powered by a child's feet pushing against a ground surface. However, in the exemplary embodiment, battery assembly 22 is electrically coupled to motor assembly 24 to provide power thereto. Battery assembly 22 is electrically coupled to motor assembly 24 through coupling devices. The coupling devices may include cords, cables, wires or similar electrical connectors.

Battery assembly 22 is adapted to be mounted to body 14. Depending on the size and shape of battery assembly 22 and the shape of vehicle 10, battery assembly 22 may be disposed at any desired location on body 14. For example, battery assembly 22 may be mounted under seat 16 or within a storage compartment, such as compartment 23. Battery assembly 22 may include one or more conventional batteries. Typically, battery assembly 22 may include one or more, six and/or twelve volt batteries adapted to power the motor assembly. Batteries with different voltages may also be used. The batteries may be rechargeable batteries.

Motor assembly 24 includes at least one motor adapted to drive at least one driven wheel 30. The motor assembly, in the embodiment described herein, is a battery-powered motor assembly. It should be understood that other power sources may be used and are within the scope of the invention. Motor assembly 24 is coupled to the at least one driven wheel through a motor output linkage assembly 26 as known in the art. Motor assembly 24 may also drive other movable components on vehicle 10.

Drive assembly 20 may be configured to allow vehicle 10 to travel across a surface at different user-selected speeds. By using multiple motors, multiple batteries, and/or gear boxes, vehicle 10 may be driven at two or more selected speeds. Motor assembly 24 may direct driven wheel 30 to rotate faster or slower using a gear box to control the relative rate of rotation of the driven wheel relative to the output of the motor assembly. Additionally, or alternatively, two or more motors and/or batteries may be selectively switched between series and parallel configurations. Moreover, vehicle 10 may be adapted such that it is operable in reverse where the driven wheel is directed to rotate in a reverse direction.

Vehicle 10 may also include user control devices that may be connected to battery assembly 22 and/or motor assembly 24. Such control devices allow a user to control the operation of the vehicle, as well as the speed of the vehicle. For example, as illustrated in FIG. 1, vehicle 10 includes a pedal 34 which allows a rider to control the motor assembly, and therefore, control the operation of the drive wheel or wheels. Pedal 34 is positioned such that a child can comfortably reach pedal 34 when seated on seat 16 of vehicle 10. Additionally, vehicle 10 may also include buttons, reverse and speed control switches, levers, knobs and other devices, such as schematically illustrated at 36 in FIGS. 1 and 3, which are used to control drive assembly 20 of vehicle 10 and are preferably positioned for actuation by a child rider seated on seat 16.

A child rider can also control the path along which vehicle 10 travels using steering assembly 28. Steering assembly 28 is coupled to at least one steerable wheel, which may also, but not necessarily be one of the driven wheel or wheels 30, as shown in FIG. 2. Alternatively, steering assembly 28 may be coupled to one or more of the non-driven wheels or combination of driven and non-driven wheels.

Figure 4:
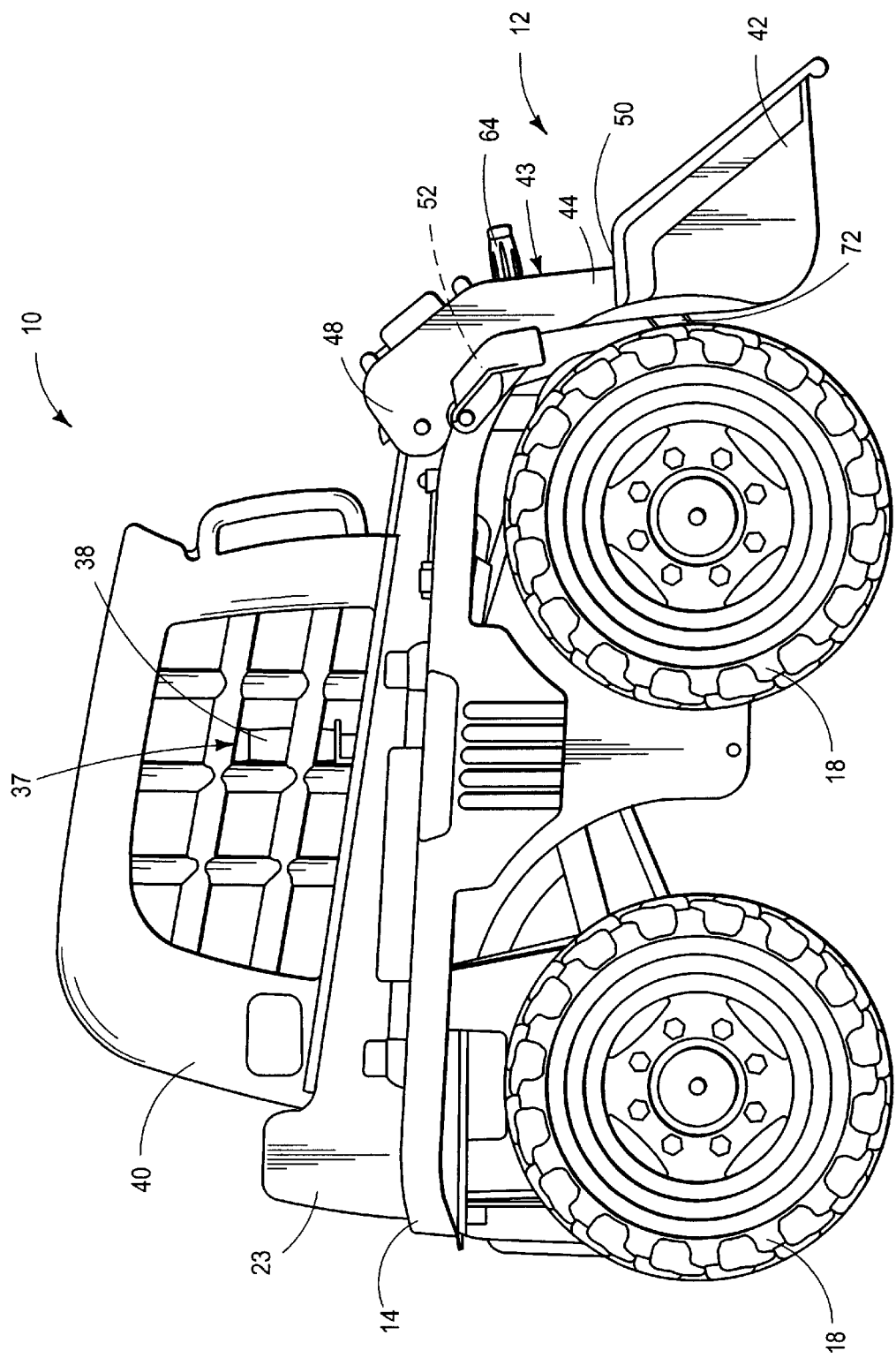
FIG. 4 is a side view of the ride-on vehicle of FIG. 1 with the bucket assembly shown in a lowered position.

Steering assembly 28 includes a steering mechanism shown generally at 37 in FIGS. 1 and 4. Steering mechanism 37 projects into passenger region 15 of body 14 of vehicle 10 and is accessible by a child rider seated on seat 16. Steering mechanism 37 may be any steering device known in the art, including, but not limited to, a steering wheel, handle bars or levers. By way of illustration, FIGS. 1 and 3 show two steering levers 38 in body 14 which are pivotal by the rider to steer the rear-driven wheels. Examples of suitable steering assemblies are described in copending U.S. patent application Ser. No. 09/780,592, which was filed on Feb. 8, 2001, is entitled "Steering Assembly for Children's Ride on Vehicles" and the complete disclosure of which is hereby incorporated by reference. Alternatively, steering levers 38 may be configured to steer the front non-driven wheels or all four wheels.

Vehicle 10 may also include additional features to make the vehicle more closely resemble the corresponding adult, or full-size, version. For example, in FIGS. 1, 3 and 4, vehicle 10 is shown with a simulated roll cage 40 to make the vehicle appear more like a full-sized skid steer loader. Roll cage 40 may be made of moldable plastic or any other suitable material. Roll cage 40 may be removable, however the exemplary embodiment shows a roll cage, which is not intended to be removed. Although shown having two sidepieces, roll cage 40 may have other configurations and may be constructed as a single integral unit forming an enclosed region.

Vehicle 10 also includes bucket assembly 12. As shown, bucket assembly 12 is disposed on the front region of body 14 of vehicle 10, but it is within the scope of the invention that bucket assembly 12 may be positioned and/or extend elsewhere on the vehicle. Bucket assembly 12 is adapted to provide a mechanism for loading, unloading, and transporting different items, including, dirt, rocks, toys, and any other items that a child may load into a shovel or other similar device. Bucket assembly 12 may be constructed of moldable plastic or any other similar material.

Bucket assembly 12 includes a bucket 42. Bucket 42 is configured to carry a predetermined amount of load. Bucket 42 is typically constructed of moldable plastic, however other similar material may be used. The size of bucket 42 may vary depending on the construction and size of vehicle 10. Additionally, although a bucket is shown in the illustrated embodiments, it is within the scope of the invention that other structures may be used in place of bucket 42. For example, bucket assembly 12 may include a structure that resembles a corresponding attachment used on full-sized skid steer loaders. Examples of these full-sized attachments, other than buckets, include trenchers, brooms, augers, pallet forks, planers, hammers, rakes, grinders, compactors and the like. Moreover, it is within the scope of the invention, that arm assembly 43 (as described below) may include mounts that selectively receive interchangeable attachments, such as those described above, that have any suitable mounting structure adapted to selectively couple the attachment to the arm assembly.

Bucket assembly 12 includes an arm assembly, shown generally at 43 in FIGS. 1 and 4, which extends outwardly from body 14. Arm assembly 43 couples bucket 42 to vehicle 10. As shown in FIGS. 1 and 3, arm assembly 43 includes two arms 44, which attach bucket assembly 12 to body 14. However, it should be understood that any number of arms may be used to attach bucket assembly 12 to body 14. For example, a single arm could be used to couple bucket assembly 12 to body 14 of vehicle 10.

Arm 44 may be rotatably attached to body 14 by any conventional fastener. For example, as shown in the exploded view in FIG. 5, arm 44 is attached to body 14 through arm pin 46. Arm pin 46 extends through an aperture in arm 44. Alternatively and/or additionally, arm 44 may be attached to a bucket handle assembly 60 through a handle assembly pin 62. Handle assembly pin 62 may couple the bucket handle assembly 60 directly to body 14. Body 14 may have holes to receive arm pin 46 and/or handle assembly pin 62.

Arm 44 has a first region 48 and a second region 50 as shown in FIGS. 3 and 4. First region, which may be referred to as an attachment region 48, couples bucket assembly 12 to body 14 of vehicle 10. Second region, which may be referred to as a bucket connection 50, couples bucket 42 to arm 44. Bucket 42 and arm 44 may be a single integral moldable plastic unit as shown in exemplary bucket assembly 12 in FIGS. 1 and 3. Alternatively, bucket 42 and arm 44 may include separate parts secured together using suitable fasteners.

Arm assembly 43 is pivotally attached to body 14 such that arm assembly 43 and each arm 44 are selectively moveable between a plurality of predetermined arm or arm assembly positions. Movement of arm assembly 43 results in the respective motion of bucket assembly 12. For example, bucket assembly 12 or arm assembly 43/arm 44 may be moveable between a lowered position, a partially raised position and a fully raised position. In the lowered position, bucket 42 is lowered toward the ground surface. In the exemplary embodiment shown in FIG. 4, bucket assembly 12 and arm 44 are in a lowered position. Fragmented views of bucket assembly 12 in a partially raised position and a fully raised position are shown respectively in FIGS. 8 and 9. A locking mechanism, as described herein, operates to selectively retain arm 44 in each of the arm positions.

Arm 44 may optically include a contact region 52 on arm 44, such as shown in FIGS. 4 and 5. Contact region 52 is adapted to retain the bucket assembly in each of the predetermined arm positions. Contact region 52 may have teeth, detents or similar engagement mechanisms, which are configured to selectively retain arm 44 in a selected arm position.

Contact region 52 and arm 44 may be a single molded integral unit. Alternatively, contact region 52 may be separately constructed. Since contact region 52 may receive stress in operation of arm 44, it may be advantageous to use multiple parts, which are replaceable and may be constructed from durable materials. For example, in FIG. 5, contact region 52 of arm 44 is on a second component, namely bucket latch 54. Bucket latch 54, as shown in FIG. 5, is insertable into an opening 56 on arm 44. Flanges on bucket latch 54 may be used to secure bucket latch 54 to arm 44. Bucket latch 54 may additionally be secured to arm 44 with a conventional fastener, such as a screw (not shown).

Operation of bucket latch 54 is similar to operation of contact region 52. As described above, contact region 52 of arm 44 includes engagement mechanisms, which operate to retain arm 44 in each selected position. By way of illustration, bucket latch 54 has detents 58 as shown in FIG. 5. Detents 58 are adapted to selectively retain arm 44 in at least one of the predetermined arm positions.

Bucket assembly 12 also includes a handle assembly 60. Handle assembly 60 is moveable between a plurality of handle positions and is moveable about a first axis relative to body 14 and arm assembly 43. However, arm 44 is operatively coupled to handle assembly 60, such that bucket assembly 12 is selectively moveable to a number of positions responsive to movement of the handle assembly. Handle assembly 60 is disposed between body 14 and arm 44 such that arm 44 pushes against handle assembly 60. Hence, as handle assembly 44 is moved about its axis, arm 44 follows and bucket assembly 12 is moved between a plurality of positions.

Handle assembly 60 may include a grippable portion 64 and a locking portion 66 as best shown in FIGS. 5 and 6. Grippable portion 64 is configured to be gripped by a child seated on the passenger seat of vehicle 10. For example, as shown in FIG. 3, grippable portion 64 projects into the passenger region of vehicle 10. Grippable portion 64 of handle assembly 60 is positioned such that a child could comfortably reach grippable portion 64 when seated on seat 16 of vehicle 10.

Locking portion 66 of handle assembly 60, as shown in FIG. 6, is configured to align with contact region 52 of arm 44. Locking portion 66 includes a receiving mechanism 67 (FIG. 6) that is adapted to receive an engagement mechanism 69 (FIG. 5) disposed on arm assembly 43/arm 44. For example, engagement mechanisms 69 on contact region 52 are received within locking portion 66 of handle assembly 60 to selectively retain arm 44 in the predetermined arm positions. For example, as shown in FIG. 5, detent pattern 58, which includes a plurality of depressions, is configured to engage a bucket latch pin 68 in locking portion 66. When bucket assembly 12 is in a raised position, the detent pattern 58 will align with bucket latch pin 68. Bucket latch pin 68 locks arm 44, preventing bucket assembly 12 from collapsing to the lowered position. Alternatively, it is within the scope of the invention, that the receiving mechanism be coupled to arm 44 and the engagement mechanism coupled to handle assembly 60 or body 14.

Although arm 44 and handle assembly 60 are independent components, arm 44 may be urged against bucket handle assembly 60 through biasing member 70, as shown in the exploded view in FIG. 5. Biasing member 70 prevents arm 44 from being forcefully raised without engaging bucket handle assembly 60. By urging arm 44 against bucket handle assembly 60, a child is prevented from pinching a finger or other body portion between arm 44 and bucket handle assembly 60. In the exemplary embodiment, biasing member 70 is in the form of a coil extension spring which couples arm 44 to locking portion 66 of bucket handle assembly 60. Spring 70 may be attached to arm assembly 44 and bucket handle assembly 60 through conventional fasteners, such as screws, bolts, clips or similar devices. Alternatively, biasing member 70 may include a tension spring, torsion spring, leaf spring, elastomeric member or the like. Regardless of the type of attachment mechanism, biasing member 70 acts to retain arm 44 against bucket handle assembly 60.

Additionally, bucket handle assembly 60 may include raised side guards or covers 71 as shown in FIG. 6. These safety guards 71 prevent a child from slipping a finger or other body part between handle assembly 60 and arm 44. For example, as shown in FIG. 6, raised side guards 71 cradle locking portion 66. When arm 44 is urged against locking portion 66 by biasing member 70, side guards 71 make it difficult for a child to slip their fingers between arm 44 and locking portion 66. Alternatively, covers may be used to prevent pinching of a child's fingers between arm 44 and bucket handle assembly 60 and are within the scope of this invention.

Figure 9:
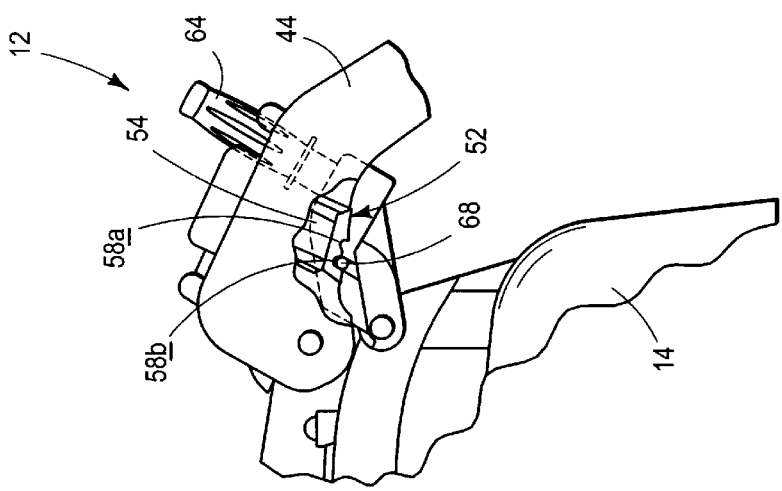
FIG. 9 is a fragmentary side elevation view of the bucket assembly in FIG. 1 shown in a fully raised position.
Figure 8:
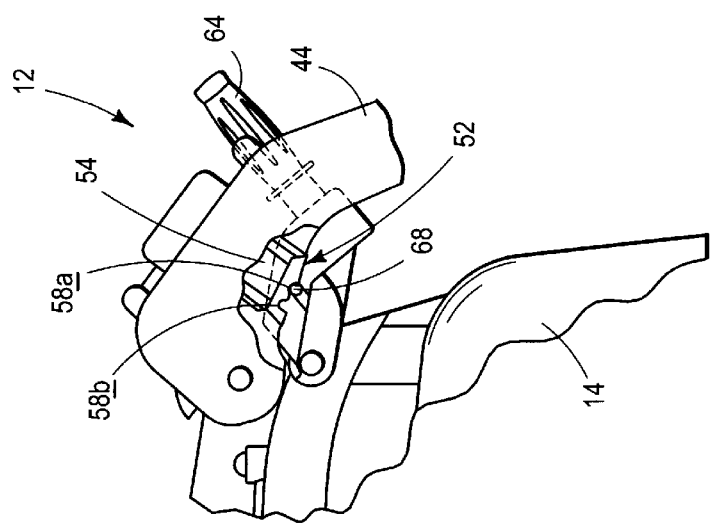
FIG. 8 is a fragmentary side elevation view of the bucket assembly in FIG. 1 shown in a partially raised position.
Figure 7:
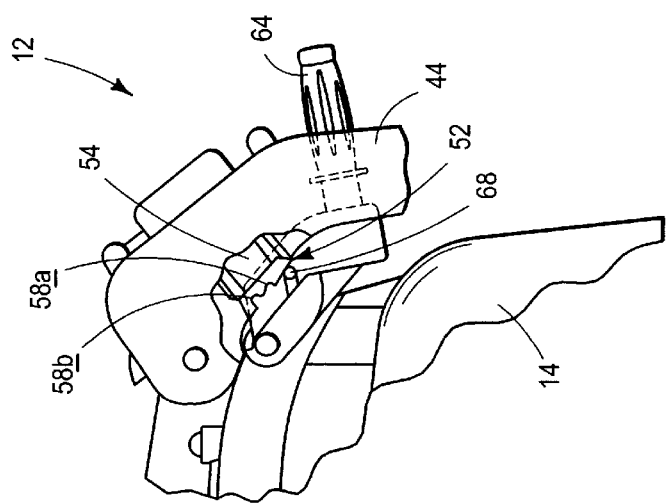
FIG. 7 is a fragmentary side elevation view of the bucket assembly in FIG. 1 shown in the lowered position.

Turning attention now to FIGS. 7–9, the operation of bucket assembly 12 may be more readily understood. As described above, arm 44 is rotatively coupled to locking portion 66 of bucket handle assembly 60. When bucket assembly 12 is in the lowered position, as shown fragmented in FIG. 7, bucket latch pin 68 rests against the backside of arm 44. When grippable portion 64 of bucket handle assembly 60 is rotated upwards toward body 14, arm 44 pivots, causing bucket assembly 12 to be raised. Arm 44 may be selectively retained in the raised positions.

FIG. 8 shows arm 44 locked in an intermediate, or partially raised, position. As contact region 52 on arm 44 slides past locking portion 66 of bucket handle assembly 60, the detent pattern on contact region 52 or bucket latch 54 engages locking portion 66. For example in FIG. 8, bucket latch pin 68 is received by a first detent 58*a* on bucket latch 54 preventing arm 44 from slipping back to the lowered position.

Similarly in FIG. 9, arm 44 of the exemplary embodiment, is shown locked in a fully raised position. Grippable portion 64 of bucket handle assembly 60 has been rotated toward body 14. As a result, arm 44 has been raised such that bucket latch pin 68 engages a second detent 58*b*. Although only two detents are shown, it is within the scope of the invention to include any number of detents on contact region 52. By increasing the number of detents, the number of defined positions for arm 44 can also be increased.

Bucket assembly 12 of vehicle 10 is configured to carry a predetermined maximum load. When the maximum load is exceeded, bucket assembly 12 is configured to breakaway from a raised position and drop to the lowered position (as shown in FIG. 4). This breakaway mechanism is a safety mechanism, which prevents a child from overloading the bucket and upending or overturning vehicle 10. Generally, the breakaway mechanism operates such that the engagement mechanism on contact surface 52 releases from locking portion 66 of bucket handle assembly 60 when the maximum load is exceeded. More particularly, detent pattern 58 is configured to release arm 44 upon application of a load greater than the maximum predetermined load.

For example, if bucket 42 (not shown in FIG. 8) is loaded such that it exceeds the maximum load, then arm 44 will slip from the partially raised position (shown in FIG. 8) to the lowered position (shown in FIG. 7). Bucket lever pin 68 will slip from detent 58*a* (as shown in FIG. 8) upon application of the excessive load, and slide to a position below detent 58*a* on the under surface of arm 44 (as shown in FIG. 7). Likewise in FIG. 9, if bucket 42 (not shown in FIG. 8) is overloaded, then bucket lever pin 68 will slip from detent 58*b* (as shown in FIG. 9) and as arm 44 slips, bucket lever pin 68 will be disposed to a position below detent 58*a* on the under surface of arm 44 (as shown in FIG. 7). Hence, arm 44 will slip from the fully raised position to the lowered position upon application of the excessive load.

Figure 10:
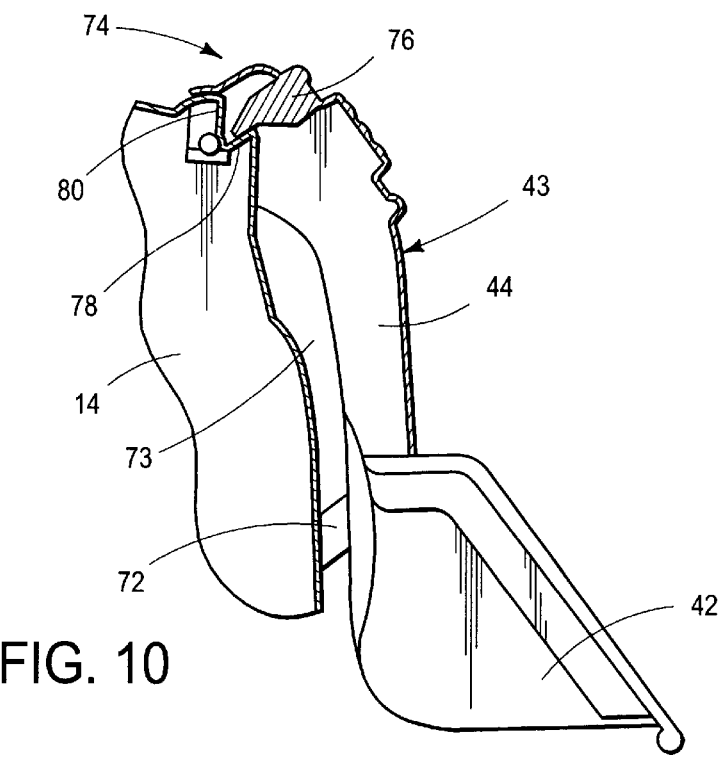
FIG. 10 is a fragmentary side elevation view of the bucket assembly in FIG. 1 in the lowered position and showing a pinch mechanism and a stopping assembly.
Figure 11:
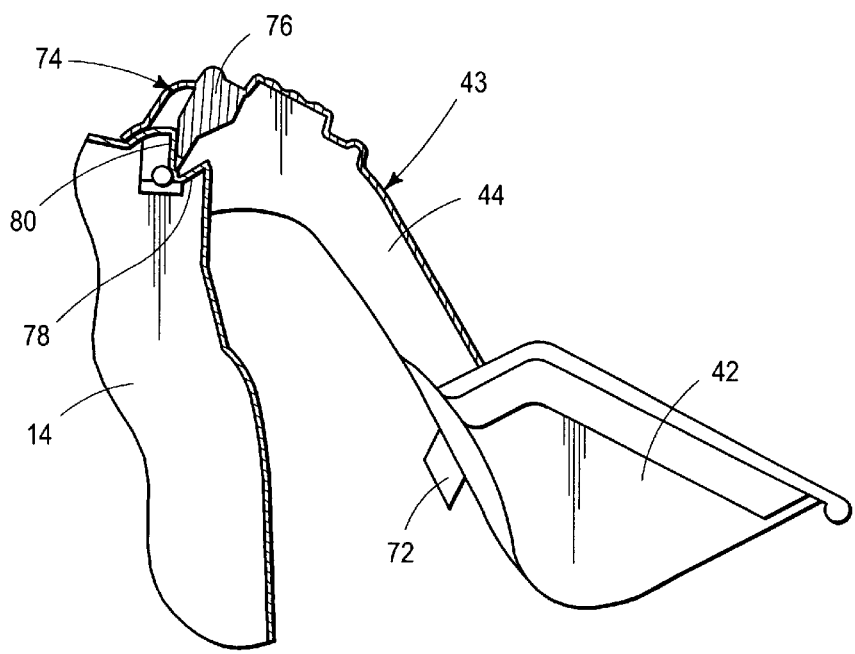
FIG. 11 is a fragmentary side elevation view of the bucket assembly in FIG. 1 in the fully raised position showing the pinch mechanism and the stopping assembly.

Another safety mechanism that bucket assembly 12 may alternatively, or additionally, include a pinch relief mechanism 72, as shown in FIGS. 10 and 11. Pinch relief mechanism 72 is configured to prevent a child from pinching a finger or other body part between bucket assembly 12 and body 14. Even when bucket assembly 12 is forcibly pushed against body 14, pinch relief mechanism 72 defines a passage 73 (shown in FIG. 10), which prevents bucket assembly 12 from collapsing against body 14. In the exemplary embodiment as shown in FIG. 10, pinch relief mechanism 72 is interposed between bucket 42 and body 14 when bucket assembly 12 is in the lowered position. Pinch relief mechanism 72, as shown, is a spacer, which is configured to maintain a spaced relationship between bucket 42 and body 14 when bucket assembly 12 is in the lowered position. Pinch relief mechanism 72 may be constructed of moldable plastic, rubber or any other suitable material.

Pinch relief mechanism 72 may be attached to bucket 42, arm 44, and/or body 14. For example, as shown in FIG. 11, pinch relief mechanism 72 is attached to the backside of bucket 42. Pinch relief mechanism 72 may be molded as part of bucket 42 or may be a separate part attached to bucket 42 with conventional fasteners, such as screws, bolts, etc. Alternatively, pinch relief mechanism 72 could be attached to body 14.

Bucket assembly 12 may alternatively, or additionally, include a stopping assembly 74. Stopping assembly 74 prevents arm 44 from being forcibly moved or extended beyond the predetermined positions. For example as shown in FIG. 10, stop 76 engages a lower stopping surface 78 when bucket assembly 12 is in the lowered position. Stopping surface 78 prevents arm 44 from being forced beyond the lowered position and maintains the space between body 14 and arm 44. In the exemplary embodiment, stop 76 is on arm 44 and lower stopping surface 78 is on body 14. Alternatively, it is within the scope of the invention that stop 76 is on body 14 and lower stopping surface 78 on arm 44.

Stopping assembly 74 also prevents bucket assembly 12 from being lifted beyond an uppermost position. For example, in FIG. 11, stop 76 is prevented from upward rotation by stopping surface 80. Similar to FIG. 10, the exemplary embodiment shows stop 76 as part of arm 44 and stopping surface 80 on body 14. However, stop 76 may conversely be on body 14 and stopping surface 80 on arm 44. Regardless of the location of stop 76 and stopping surface 80, stopping assembly 74 prevents a child from lifting bucket assembly 12 beyond the predetermined positions.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A children's ride-on vehicle, the vehicle comprising:
a vehicle body defining a passenger region with a seat adapted to carry a child;
a ground traveling structure attached to the body;
a drive assembly coupled to drive the ground traveling structure; and
a bucket assembly, comprising:
an arm assembly coupled to the body, wherein the arm assembly has a contact region with a detent pattern;
a bucket coupled to the arm assembly and configured to carry a predetermined amount of load;
a handle assembly adapted to move the arm assembly relative to the body, wherein the handle assembly is moveable between a plurality of handle positions, which include a lowered position and at least one raised position, and which coincide with a plurality of arm positions; and
a locking portion on the handle assembly, disposed between the body and the arm assembly, which engages the detent pattern of the arm assembly and is adapted to selectively retain the arm assembly in each of the arm positions, wherein the locking portion is configured to release the arm assembly from engagement with the detent pattern for return toward the lowered position when the predetermined amount of load is exceeded.

2. The children's vehicle of claim 1, further comprising at least one pinch relief mechanism adapted to extend between the arm assembly and the body, wherein the pinch relief mechanism is adapted to maintain a spaced relationship between the arm assembly and the body when the bucket assembly is in the lowered position.

3. The children's vehicle of claim 1, further comprising at least one pinch relief mechanism attached to the arm assembly and adapted to contact the body when the bucket assembly is in the lowered position, wherein the pinch relief mechanism is adapted to maintain a spaced relationship between the arm assembly and the body.

4. The children's vehicle of claim 1, further comprising at least one pinch relief mechanism attached to the body and adapted to contact the arm assembly when the bucket assembly is in the lowered position, wherein the pinch relief mechanism is adapted to maintain a spaced relationship between the arm assembly and the body.

5. The children's vehicle of claim 1, further comprising a stopping assembly adapted to restrain movement of the arm assembly beyond the plurality of arm positions, wherein the stopping assembly includes a stop positioned on one of the arm assembly and the body and configured to contact a stopping surface on the other of the arm assembly and the body when the arm assembly is moved beyond the plurality of arm positions.

6. The children's vehicle of claim 1, wherein the handle assembly includes a grippable portion which extends into the passenger region and is adapted to be grasped by a child.

7. The children's vehicle of claim 1, wherein the ground traveling structure includes wheels.

8. The children's vehicle of claim 1, wherein the drive assembly further comprises a motor assembly adapted to drive the ground traveling structure and a battery assembly adapted to provide power to the motor assembly.

9. The children's vehicle of claim 1, wherein the body further comprises a simulated roll cage structure defining at least a portion of the passenger region.

10. The children's vehicle of claim 1, wherein the body further comprises a biasing member adapted to urge the arm assembly against the handle assembly.

11. The children's vehicle of claim 1, wherein the contact region is part of a bucket latch, which is attached to the arm assembly.

12. The children's ride-on vehicle of claim 1, wherein the bucket defines an opening through which objects may be inserted into and removed from the bucket, and further wherein the bucket is configured so that the opening faces generally away from the vehicle body as the arm assembly is moved between the plurality of arm positions.

13. The children's ride-on vehicle of claim 1, wherein the bucket is rigidly coupled to the arm assembly so that the bucket is not moveable independent of the arm assembly.

14. The children's ride-on vehicle of claim 1, wherein the arm assembly is configured to extend forwardly from a front region of the vehicle body.

15. A children's ride-on vehicle, the vehicle comprising:
a vehicle body defining a passenger region with a seat adapted to carry a child;
a ground traveling structure attached to the body;
a drive assembly coupled to drive the ground traveling structure; and
a bucket assembly, comprising:
a handle operatively coupled to the body and moveable about a first axis;
an arm assembly wherein the arm assembly is mounted for cooperative movement with the handle, the arm assembly adapted to be selectively moveable between a plurality of predetermined positions, including a lowered position and at least one raised position;
a bucket attached to the arm assembly;
at least one pinch relief mechanism which is adapted to extend between the arm assembly and the body when the bucket is in the lowered position to maintain a spaced relationship between the arm assembly and the body; and
a stopping assembly adapted to restrain movement of the arm assembly beyond the predetermined positions, wherein the stopping assembly includes a stop positioned on one of the arm assembly and the body configured to contact a stopping surface on the other of the arm assembly and the body when the arm assembly is moved beyond the predetermined positions.

16. The children's ride-on vehicle of claim 15, wherein the stopping assembly includes a stop on the arm assembly, the stop contacting a lower stopping surface on the body when the arm assembly is in the lowered position.

17. The children's ride-on vehicle of claim 15, wherein the stopping assembly includes a stop on the arm assembly, the stop contacting an upper contacting surface on the body when in an uppermost one of the at least one raised positions.

18. The children's vehicle of claim 15, further comprising at least one pinch relief mechanism attached to the arm assembly and adapted to contact the body when the arm assembly is in the lowered position, wherein the pinch relief mechanism is adapted to maintain a spaced relationship between the arm assembly and the body when the arm assembly is in the lowered position.

19. The children's vehicle of claim 15, further comprising at least one pinch relief mechanism attached to the body and adapted to contact the arm assembly when the arm assembly is in the lowered position, wherein the pinch relief mechanism is adapted to maintain a spaced relationship between the arm assembly and the body when the arm assembly is in the lowered position.

20. The children's vehicle of claim 15, wherein the handle has a grippable portion and a locking portion, the locking portion disposed between the body and the arm assembly and adapted to selectively retain the arm assembly in each of the plurality of predetermined positions.

21. The children's vehicle of claim 20, wherein the arm assembly has a contact region with at least one detent, wherein the locking portion of the handle is adapted to receive the detent to selectively retain the arm assembly in each of the plurality of predetermined positions.

22. The children's vehicle of claim 15, wherein the drive assembly further comprises a motor assembly adapted to drive the ground traveling structure and a battery assembly adapted to provide power to the motor assembly.

23. The children's ride-on vehicle of claim 15, wherein the bucket defines an opening through which objects may be inserted into and removed from the bucket, and further wherein the bucket is configured so that the opening faces generally away from the vehicle body as the arm assembly is moved between the plurality of predetermined positions.

24. The children's ride-on vehicle of claim 15, wherein the bucket is rigidly attached to the arm assembly so that the bucket is not moveable independent of the arm assembly.

25. The children's ride-on vehicle of claim 12, wherein the arm assembly is configured to extend forwardly from a front region of the vehicle body.

26. A child's battery-powered ride-on vehicle, the vehicle comprising:
   a reduced-scale vehicle body adapted to carry a child, the body having a front portion, and a passenger region and a seat adapted to receive a child sitting in the passenger region;
   a ground traveling structure attached to the body and including at least one driven wheel and at least one steerable wheel;
   a steering assembly adapted to steer the at least one steerable wheel and including a steering mechanism positioned for operation by a child seated on the seat;
   a motor assembly including at least one battery-powered motor adapted to drive the at least one driven wheel;
   a battery assembly including at least one battery adapted to provide power to the motor assembly; and
   a bucket assembly extending from the front portion of the body, the bucket assembly comprising:
      an arm assembly having a first region and a second region, with the first region pivotally attached to the body;
      a bucket attached to the second region of the arm assembly and configured to carry a predetermined amount of load;
      a handle assembly coupled for movement relative to the body and the arm assembly and adapted to move the arm assembly between a plurality of arm positions, including a lowered position and at least one raised position; and
      a locking mechanism adapted to extend between the arm assembly and the body to selectively retain the arm assembly in each of the plurality of arm positions, wherein the locking mechanism is configured to release the arm assembly when the predetermined amount of load is exceeded.

27. The children's ride-on vehicle of claim 26, wherein the locking mechanism includes a receiving member coupled to one of the arm assembly and the handle assembly adapted to receive an engagement member coupled to the other of the arm assembly and the handle assembly.

28. The children's ride-on vehicle of claim 27, wherein the receiving member includes a pin and the engagement member includes at least one detent.

29. The children's ride-on vehicle of claim 26, wherein the handle assembly is adapted to engage the arm assembly to raise the arm assembly to the plurality of arm positions.

30. The children's vehicle of claim 26, further comprising at least one pinch relief mechanism adapted to extend between the arm assembly and the body when the arm assembly is in the lowered position to maintain a spaced relationship between the arm assembly and the body.

31. The children's vehicle of claim 26, further comprising a stopping assembly adapted to restrain movement of the arm assembly beyond the plurality of arm positions, wherein the stopping assembly includes a stop positioned on one of the arm assembly and the body configured to contact a stopping surface on the other of the arm assembly and the body when the arm assembly is moved beyond the plurality of arm positions.

32. The children's ride-on vehicle of claim 26, wherein the bucket defines an opening through which objects may be inserted into and removed from the bucket, and further wherein the bucket is configured so that the opening faces generally away from the vehicle body as the arm assembly is moved between the plurality of arm positions.

33. The children's ride-on vehicle of claim 26, wherein the bucket is rigidly attached to the second region of the arm assembly so that the bucket is not moveable independent of the arm assembly.

34. A children's battery-powered ride-on vehicle, the vehicle comprising:
   a reduced-scale vehicle body adapted to carry a child, the body having a passenger region sized to receive a child;
   a ground traveling structure attached to the body and including at least one driven wheel and at least one steerable wheel;
   a motor assembly including at least one battery-powered motor adapted to drive the at least one driven wheel;
   a battery assembly including at least one battery adapted to provide power to the motor assembly;
   a steering assembly adapted to steer the at least one steerable wheel and including a steering mechanism positioned for operation by a child in the passenger region; and
   a bucket assembly extending from the body, the bucket assembly comprising:
      an arm assembly operatively attached to the body including at least one arm, the arm having a contact region;
      a bucket attached to the at least one arm, and
      a handle assembly pivotally coupled to the body adapted to engage the arm to move the arm between a plurality of predetermined arm positions, the handle assembly having a grippable portion projecting into the passenger region and adapted to be gripped by a child, wherein the handle assembly further includes a locking portion configured to selectively engage the contact region of the arm, and further wherein the locking portion is adapted to selectively retain the arm in each of the plurality of predetermined arm positions.

35. The children's ride-on vehicle of claim 34, wherein the handle assembly pivots about a first axis to effect the arm to slidingly engage the locking portion of the handle assembly as the arm is moved between the plurality of arm positions.

36. The children's ride-on vehicle of claim 34, wherein the locking portion includes a pin adapted to engage the contact region of the arm.

37. The children's ride-on vehicle of claim 34, wherein the contact region of the arm includes at least one detent.

38. The children's vehicle of claim 24, wherein the predetermined arm positions include a lowered position and at least one raised position, such that the contact region of the bucket assembly when in a raised position is configured to slip from the locking portion of the handle assembly when a predetermined load is applied, releasing the arm assembly to the lowered position.

39. The children's vehicle of claim 34, also comprising at least one pinch relief mechanism adapted to extend between the arm and the body when the arm is in a lowered position to maintain a spaced relationship between the arm and the body.

40. The children's vehicle of claim 34, also comprising a stopping assembly adapted to restrain movement of the arm beyond the plurality of arm positions, wherein the stopping assembly includes a stop positioned on one of the arm and the body configured to contact a stopping surface on the other of the arm and the body when the arm is moved beyond the plurality of arm positions.

41. The children's ride-on vehicle of claim 34, wherein the bucket defines an opening through which objects may be inserted into and removed from the bucket, and further wherein the bucket is configured so that the opening faces generally away from the vehicle body as the arm assembly is moved between the plurality of predetermined arm positions.

42. The children's ride-on vehicle of claim 34, wherein the bucket is rigidly coupled to the at least one arm so that the bucket is not moveable independent of the arm assembly.

43. The children's ride-on vehicle of claim 34, wherein the bucket assembly is configured to extend forwardly from a front region of the body.

* * * * *

UNITED STATES PATENT AND TRADEMARK OFFICE
CERTIFICATE OF CORRECTION

PATENT NO.    : 6,508,320 B2
DATED         : January 21, 2003
INVENTOR(S)   : Kurt J. Huntsberger and Daniel J. Damon It is certified that error appears in the above-identified patent and that said Letters Patent is hereby corrected as shown below:

Column 11,
Line 24, after "The children's ride-on vehicle of" please delete "claim 12" and insert -- claim 15 -- therefor.

Column 13,
Line 6, after "The children's vehicle of" please delete "claim 24" and insert -- claim 34 -- therefor.

Signed and Sealed this

Tenth Day of June, 2003

JAMES E. ROGAN
*Director of the United States Patent and Trademark Office*